Figure 1:
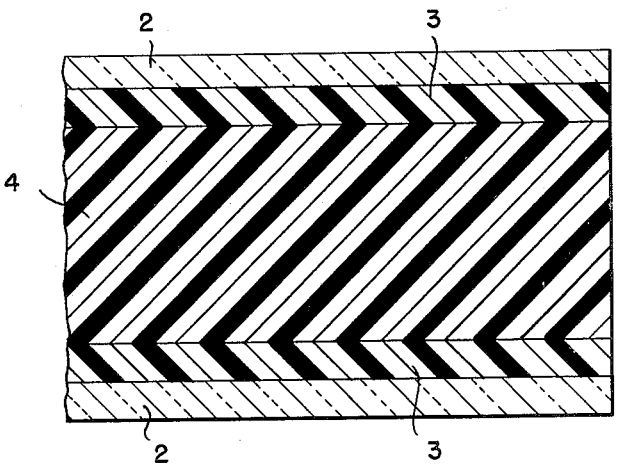

July 4, 1961  A. G. WORRALL  2,991,209
TRANSPARENT BULLET RESISTING STRUCTURE
Filed Dec. 31, 1956

INVENTOR.
ARTHUR G. WORRALL
BY
ATTORNEYS

United States Patent Office 2,991,209
Patented July 4, 1961

2,991,209
TRANSPARENT BULLET RESISTING STRUCTURE
Arthur G. Worrall, Wyncote, Pa., assignor to Safetee Glass Company, Philadelphia, Pa., a corporation of Pennsylvania
Filed Dec. 31, 1956, Ser. No. 631,572
4 Claims. (Cl. 154—52.5)

This invention relates to a bullet resisting structure and, more particularly, to a light weight laminated transparent glass and plastic structure having the excellent bullet resisting properties of certain relatively hard plastic materials and the desirable surface properties of glass. This application is a continuation-in-part of my copending patent application Serial No. 464,070, filed October 22, 1954, and now abandoned.

It is an object of this invention to provide a light weight transparent bullet resisting structure capable of stopping the same caliber bullet as can be stopped by conventional bullet resisting glass panels of approximately twice its weight.

It is a further object of the invention to provide a transparent bullet resisting structure capable of stopping a greater number of bullets over a given area than can be stopped by bullet resisting glasses heretofore known.

It is a further object of the invention to provide a light weight transparent bullet resisting structure having a hard surface resistant to scratches and stains.

It is a further object of the invention to provide a light weight transparent bullet resisting structure particularly adapted to be mounted in a metal frame which may undergo flexing and/or movement with respect to the structure under normal service conditions.

It is a further object of the invention to provide a light weight transparent bullet resisting structure having the above noted properties and capable of being manufactured in curved panels.

Heretofore it has been common practice to provide bullet resisting structures composed of a plurality of sheets of glass bonded together by vinyl or other relatively soft bonding materials. The hard glass provided resistance to penetration by a bullet and the relatively soft bonding materials were effective in holding the shattered glass pieces together after the structure had received a bullet. In these prior known structures, the relatively soft layers of bonding material had substantially no effect in stopping a bullet and were used solely to hold together the shattered glass particles which remained after the glass received a bullet.

In some instances there has been heretofore employed laminated structures comprising surface layers of glass secured to a relatively hard vinyl central core by means of relatively soft vinyl bonding layers. These structures were primarily devised for use in installations in which the mounting of the structure imposed on the structure vibrations and other mechanical stresses which were tolerated by the hard vinyl central core to a greater degree than would have been tolerated by a glass central core. In these structures the glass surface layers and the hard vinyl central core are generally of approximately the same thickness in order to provide a necessary overall thickness and strength without involving the use of such thickness of the relatively unclear hard vinyl as to unduly adversely effect the optical properties of the structure. These structures were not intended nor do they serve as bullet resisting structures.

My bullet resisting structure comprising a relatively thick central core of a hard plastic material having a relatively thin surface layer of glass secured to each side thereof by a thin layer of a deformable soft plastic bonding material. The hard plastic central core provides the desired bullet resistance. The glass surface layers provide the desired surface characteristics. The soft plastic bonding material allows for the necessary motion between the hard plastic central core and the glass surface layers resulting during temperature changes due to the wide dissimilarity of the coefficients of expansion of these materials.

I have found that certain hard plastic materials such as acrylic resins and some polyester resins have excellent optical clarity, impact resistance and toughness along with suitable inflexibility such as to make them desirably employed as bullet resisting materials in preference to glass or the vinyl materials.

Acrylic resins are particularly desirably employed as the core material in my bullet resistant structure. Acrylics comprise monomers and polymers of acrylic, substituted acrylic, and methacrylic acids, their salts, esters, and other derivatives, such as nitriles and amides. The acrylic resins are characterized by excellent optical properties, dimensional stability, and impact resistance, a property essential for bullet resistance. A particularly desirably employed acrylic resin is methyl methacrylate.

The core material may also be a polyester resin. Polyester resins comprise an unsaturated polyester base resin dissolved in a polymerizable monomer. Polyester resins may be defined as longchain high molecular weight esters produced by self-esterification of two or more molecules of hydroxy fatty acids. The base resin component can be prepared from innumerable chemical combinations and determines the properties of the polyester. A suitable polyester is a material known as Sierracin 611 manufactured by the Sierracin Corporation, which is a blend of thermosetting polyester resins catalyzed and cast into plates.

Certain resins falling within the broad classification of allyl resins may also be employed. This class comprises synthetic resins formed by the polymerization of chemical compounds containing the group $CH_2=CH-CH_2-$.

Another suitable material is Allymer CR-39 a polymerizable synthetic resin-forming material which is a copolymer made with diallyl diglycol carbonate and triallylcyanurate, and is manufactured by the Columbia-Southern Chemical Corporation.

Hereinafter, when the term "hard resin material" is employed it is intended to refer to material such as acrylic resins and some polyester resins and/or allyl resins having optical clarity, impact resistance, toughness, dimensional stability and inflexibility comparable to acrylic resins and preferably comparable to methyl methacrylate.

Such materials provide a clear transparent organic resinous core material having hardness of from 80 to 100 measued on the "D" scale of Durometer, having a clarity of 80% to 92% light transmission, impact strength ft. lb. per inch of notch (½ x ½ inch notched bar Izod test) of 0.2 to 0.5, a flexural strength p.s.i. 6000 to 17000, a compressive strength p.s.i. 11000 to 17000, a tensil strength p.s.i. 5000 to 12000, a specific gravity of 1.10 to 1.19 and a refractive index $nD$ 1.48 to 1.60. Such materials do not yellow or darken with age.

The outer surface layers of the bullet resisting structure are preferably formed of sheets of relatively thin polished glass plate having excellent optical properties and sufficient hardnes to be resistant to scratching as well as having high resistance afforded by the glass to staining and other types of marking.

The preferably employed bonding material for securing the glass surface layers to the central hard plastic core is the polyvinyl butyral plastic containing over 37 parts of plasticizer in 100 parts of the resin by weight. Other bonding materials may be employed provided they afford the necessary adhesion, plasticity, optical clarity and stability which is provided by the polyvinyl butyral material.

I have found that for a bullet resisting structure of any given overall thickness the optimum bullet resistance is obtained when the structure consists of the maximum possible thickness of a hard resin core combined with a minimum thickness layer of a suitable bonding material. In selecting the relative thicknesses of the glass surface layers, the bonding material and the hard resin core, the thickness of the glass is selected to be the minimum thickness of glass which will have sufficient strength to resist breakage from impact with articles normally encountered during the service life of the structure. It will be evident that with this layer of glass placed over a soft deformable layer of a bonding material the glass must be of sufficient thickness to provide the desired strength in itself without reliance upon the remainder of the structure.

In the production of a laminated structure such as this, a thick hard resin core is covered with sheets of suitable material, for example, a soft polyvinyl butyral plastic having desired thickness and then these sheets are covered with the glass facing sheets. It will be evident that this lay up is assembled with all of the parts properly cleaned and prepared for bonding in the manner well known to the art. After the various sheets are thus assembled, they are subjected to heat and pressure. The sheets are heated to approximately 250° F. and held at this temperature under pressures ranging from approximately 150 to 200 pounds per square inch for a sufficient time to bring all of the parts of the structure to a uniform temperature at which the vinyl sheets adhere to the glass surfaces and to the surface of the hard resin core.

It is particularly noted that during the heating of the lay up the individual sheets of material are free to expand in accordance with their own expansion characteristics. After the maximum temperature has been reached and bonding is accomplished, it will be evident that, upon subsequent cooling, the hard resin core, which has a coefficient of expansion of approximately ten times that of glass, will contract to a substantially greater degree than will the glass plates. This differential in contraction must be accommodated by the relatively soft bonding layer and thus the thickness of the bonding layer must be sufficient to accommodate this displacement between the thick central core and the thin glass outer layers. The strengths of the central resin core and of the bonding layer are such that if the latter is of insufficient thickness or plasticity to accommodate this displacement the compressive forces acting on the undersurfaces of the glass faces will be sufficient to cause the glass to spall away.

It has been found that for a methylmethacrylate resin core and glass surface plates, layers of polyvinyl butyral of approximately 0.125" to 0.150" are sufficient to accommodate a temperature range extending from the laminating temperature of 250° F. down to a temperature of minus 65° F. For temperature ranges extending from the laminating temperature down to approximately 0° F., a vinyl thickness of approximately 0.075" is sufficient. These thicknesses are relatively independent of the thicknesses of the glass and hard resin core employed though they do vary to some extent depending on the overall size of the sheets of material involved. It will be evident that relatively large sheets will require somewhat greater thicknesses of the deformable bonding material than are required by relatively small size sheets.

Figure 2:
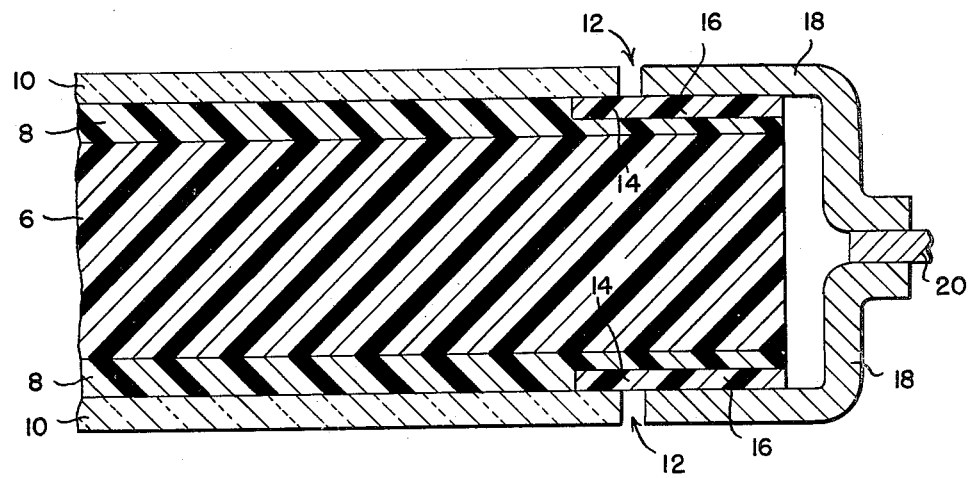

Two embodiments of the invention are shown in the figures in which:

FIGURE 1 is a transverse section through a fragmentary portion of a panel embodying the invention; and FIGURE 2 is a transverse section through a fragmentary portion of a panel embodying a modification of the invention and mounted in a supporting frame.

In FIGURE 1 the outer glass faces 2 of the laminated structure are formed of sheets of relatively thin polished glass as previously described having suitable optical properties and sufficient hardness and stain resistance to provide a protective exterior surface for the structure.

The thin glass faces 2 are secured to a thick central core 4 formed of a hard resin as hereinbefore defined by layers of a suitable bonding material 3 such as polyvinyl butyral as hereinbefore described.

Typical relative thicknesses of a specific structure are, for example, a hard resin core 0.750" thick, covered on both faces by layers of plasticized polyvinyl butyral containing at least 37 parts plasticizer per 100 of resin 0.150" thick, and glass cover plates 0.125" thick. Materials in these proportionate thicknesses provide a structure which may be satisfactorily employed under conditions of temperature ranging from minus 65° F. to plus 165° F.

This arrangement provides various advantages. It will be evident that, when approximately ¾ of the thickness of the structure is composed of hard resin material having approximately one-half the weight of glass, the total weight of the structure will be less than half the weight of a similar structure of equal thickness formed with a glass core. Additionally, the structure provides glass surfaces which, due to the hardness and various resistant properties of glass, provide outer surfaces less susceptible to scratching and staining than plastic surfaces. Furthermore, due to the fact that the outer glass faces are relatively thin, when these faces are broken or otherwise damaged as a result of impact, the bonding layers materially limits the shattering of the glass and holds broken portions of the glass in position. Additionally, because a maximum possible portion of the structure is formed of the relatively rigid impact resistant hard resin, there is obtained a maximum bullet resistance for any given overall structural thickness.

A major advantage is found in the ability of the structure to receive a greater number of bullets over a given area without penetration occurring than can be received by conventional bullet resisting glass due to the fact that the hard resin core does not crack and shatter with each bullet received to the extent that a glass core would crack and shatter. Thus the bullet resisting properties of the hard resin core persist during the reception of a greater number of bullets than do the bullet resisting properties of glass.

It is additionally noted that the glass face tends to "tumble" the bullet. Thus the bullet as it penetrates the glass and the adhesive material is displaced from its normal trajectory axis and the impact loading is distributed over a greater surface of the hard plastic core. The hard resin core prevents the bullet from passing through the structure and the layer of bonding material holds any cracked pieces of the core in position. It is particularly noted that, as previously described, the core has a much higher impact resistance than has glass and cracking occurs to a lesser degree than would occur if a glass core were used. This reduced amount of cracking in conjunction with the bonding material provides a structure which will receive and stop many more bullets over a given area than are stopped by a structure employing a glass core of equivalent thickness.

From the foregoing it will be evident that the thickness of the glass surfaces is selected to be sufficient to accommodate impact such as is normally encountered in handling and in the normal service of the structure. The thickness of the bonding material is determined by the temperature range and particularly the minimum temperature to which the assembly is to be subjected. The thickness of the hard resin core is determined by the caliber of the bullet which the structure is designed to withstand.

In FIGURE 2 there is shown a hard resin core 6 having cover glasses 10 bonded thereto by interlayers of plastic bonding material 8. In this arrangement, the glass faces 10 terminate a distance spaced from the edge of the panel as indicated at 12. The layers of bonding material 8 are cut away as indicated by the number 14 so as to leave only relatively thin layers of soft bonding material extending from the edge of the base plate 2 to somewhat below the glass faces 10. Strips 16 of a parting material such as nylon or other suitable flexible wear resistant material such as cellophane, Mylar, or silicones are positioned in the recesses provided in the layer of bonding material and thus extend from the edge of the core 6 to under the glass faces 10. Nylon is particularly desirably employed for the reason that it combines strength, flexibility, corrosion resistance and wear resistance over a wide range of temperatures and does not adhere to the vinyl interlayer on the glass faces. This lessens the tendency of the glass faces to develop edge cracks when the framed unit is vibrated.

A pair of Z-shaped frame members 18 have flanges engaging the outer surfaces of the strips 16 in regions thereof spaced from the glass faces 10. The Z-shaped members 18 are attached to a plate 20 or other suitable means serving to connect them to additional structure. For example, the Z-shaped members 18 may be connected to an aircraft structure and the fragmentary portion of the transparent bullet resisting structure shown may be a portion of the canopy of the aircraft.

This structure provides the desirable advantage of avoiding engagement of the relatively inflexible glass faces 10 by the mounting members. Particularly in installations in which there is motion or flexing of the Z-shaped members 18 with respect to the transparent structure mounted therein, it is preferable not to have hard brittle material such as glass engaged by the mounting frame.

If the Z-shaped members 18 were positioned in engagement with the full thickness layer of bonding material 8, there would exist the possibility that the laminated panel will not be firmly gripped by the Z-shaped members due to plastic flow of the bonding material and a subsequent loosening of the panel in the frame. The addition of a hard wear resistant yet slightly flexible strip 16 and the reduced thickness section of the bonding material 8 serve to substantially prevent flow of the bonding material due to frame loading for the reason that the strip 16 serves to distribute the load forces and the reduced thickness of bonding material flows less steadily.

From the foregoing, it will be evident that the invention provides a light weight transparent laminated bullet resisting structure which is bullet resistant to a greater number of bullets over a given area than is conventional bullet resisting glass. The invention also provides a transparent laminated bullet resisting structure which is particularly well adapted for mounting in a frame which may undergo vibration, flexing or other movement with respect to the structure under normal service conditions.

The invention affords further advantage in that panels constructed in accordance therewith may be manufactured in curved forms. The balanced nature of the structure and the thinness of the glass surface layers make possible the laminating of curved forms at the laminating temperature of 250° F. and the cooling of these forms from this temperature to working temperatures without encountering excessive deformations.

What is claimed is:

1. A bullet resisting laminated structure comprising a core of acrylic resin approximately .750″ thick having a layer of glass approximately .125″ thick secured to each side thereof by a layer of polyvinyl butyral plastic approximately .075″ to .150″ thick and containing over 37 parts of plasticizer in 100 parts of the resin by weight.

2. A bullet resisting laminated structure comprising a thick core of methyl methacrylate resin having on each side thereof a surface layer of glass bonded thereto by a polyvinyl butyral adhesive containing over 37 parts of plasticizer in 100 parts of resin by weight, and the thickness of said core being greater than the combined thickness of the layers of glass and the layers of polyvinyl butyral.

3. A bullet resisting laminated structure comprising a core formed of hard resin material and having a surface layer of glass secured to each side thereof by a layer of deformable bonding material, the layers of said glass terminating at a distance spaced inwardly from an edge of the structure, and a plate imbedded in each layer of bonding material extending from approximately the edge of the structure and terminating under its adjacent glass layer, said plates providing covering over an edge portion of the structure not covered by the glass layers and being adapted for engagement by structure mounting means.

4. A bullet resisting laminated structure comprising a core formed of hard resin material having impact resistance, hardness, inflexibility and optical clarity approximately equivalent to those properties of an acrylic resin, a surface layer of glass secured to each side of said core by a layer of deformable bonding material approximately .075″ to .150″ thick, the thickness of said core being greater than the combined thickness of the layers of glass and the layers of bonding material, the layers of said glass terminating at a distance spaced inwardly from an edge of the structure, and a plate imbedded in each layer of bonding material extending from approximately the edge of the structure and terminating under its adjacent glass layer, said plates providing covering over an edge portion of the structure not covered by the glass layers and being adapted for engagement by structure mounting means.

References Cited in the file of this patent

UNITED STATES PATENTS

| Number | Name | Date |
|---|---|---|
| 2,293,656 | McClain | Aug. 18, 1942 |
| 2,567,353 | Ryan | Sept. 11, 1951 |
| 2,808,355 | Christie et al. | Oct. 1, 1957 |
| 2,837,454 | Watkins et al. | June 3, 1958 |

FOREIGN PATENTS

| Number | Country | Date |
|---|---|---|
| 391,356 | Great Britain | Apr. 27, 1933 |